US009276842B2

(12) United States Patent
Shepherd et al.

(10) Patent No.: US 9,276,842 B2
(45) Date of Patent: Mar. 1, 2016

(54) METHODS AND APPARATUS FOR ROUTING USING BIFURCATED NETWORK FLOWS

(75) Inventors: Frederick B. Shepherd, Outremont (CA); Gordon T. Wilfong, Bedminster, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 2171 days.

(21) Appl. No.: 11/693,836

(22) Filed: Mar. 30, 2007

(65) Prior Publication Data

US 2008/0239959 A1    Oct. 2, 2008

(51) Int. Cl.
*H04L 12/753*    (2013.01)
*H04L 12/751*    (2013.01)
*H04L 12/715*    (2013.01)
*H04L 12/721*    (2013.01)
*H04L 12/707*    (2013.01)

(52) U.S. Cl.
CPC ............. *H04L 45/48* (2013.01); *H04L 45/02* (2013.01); *H04L 45/04* (2013.01); *H04L 45/12* (2013.01); *H04L 45/14* (2013.01); *H04L 45/24* (2013.01)

(58) Field of Classification Search
CPC ......... H04L 45/02; H04L 45/04; H04L 45/12; H04L 45/48; H04L 45/14
USPC ......................................... 370/239, 229, 230
See application file for complete search history.

(56) References Cited

U.S. PATENT DOCUMENTS 6,772,102 B1 * 8/2004 Wan et al. ........................ 703/2
6,978,394 B1 * 12/2005 Charny et al. ................... 714/4
2002/0118636 A1 * 8/2002 Phelps et al. ................. 370/222
2006/0146716 A1 * 7/2006 Lun et al. ..................... 370/238
2006/0291392 A1 * 12/2006 Alicherry et al. ............ 370/235

OTHER PUBLICATIONS

Chen et al , "(Almost) Tight Bounds and Existence Theorems for Confluent Flows" proc of the 36th ACM Symposium on Theory of Computing (STOC), pp. 529-538 (2004).
Shepherd et at , "Visualizing, Finding and Packing Dijoins", in D. Avis, A. Hertz, O Marcotte (eds ), Graph Theory and Combinatorial Optimization, 219-54 (2005).
Fortz et al., "Optimizing OSPF/OS-IS Weights in a Changing World", IEEE Journal on Selected Areas in Communications [Online], vol. 20, No. 4, pp. 756,767, May 2002.
Tanaka et al , "Analysis of Border-Collision Bifurcations in a Flow Model of a Switching System", IEICE Transactions on Fundamentals of Electronics, Communications and Computer Sciences, Engineering Sciences Society, Tokyo, JP, vol. E85-A, No. 4, pp. 734-739, Apr. 2002.

* cited by examiner

*Primary Examiner* — Omer S Mian
(74) *Attorney, Agent, or Firm* — Ryan, Mason & Lewis, LLP

(57) ABSTRACT

Methods and apparatus are provided with improved routing techniques for bifurcated flows. Routing methods and apparatus are provided that obtain a fractional flow from a set of nodes to a given destination having a maximum load, L, on any link between a node in the set and the given destination; and generate a bifurcated flow between the set of nodes and the given destination from the fractional flow such that the maximum load on any link in the bifurcated flow does not exceed 2L, wherein the bifurcated flow allows a flow from a given node to be sent on at most two outgoing links. The fractional flow can be, for example, a fractional single-sink multicommodity flow.

17 Claims, 3 Drawing Sheets

US 9,276,842 B2

METHODS AND APPARATUS FOR ROUTING USING BIFURCATED NETWORK FLOWS

STATEMENT OF GOVERNMENT RIGHTS

This invention was made with Government support under grant number N000140610396, awarded by the Office of Naval Research (ONR). The Government may have certain rights in this invention.

FIELD OF THE INVENTION

The present invention relates to network touting techniques, and more particularly, to methods and apparatus for network routing using bifurcated flows.

BACKGROUND OF THE INVENTION

J. Chen et al, "(Almost) Tight Bounds and Existence Theorems for Confluent Flows," Proc. of the 36th ACM Symposium on Theory of Computing (STOC), 529-38 (2004) describes routing techniques for a class of network flows referred to as confluent flows. In particular, Chen et al describe techniques for finding confluent flows with small congestions. The congestion of a node is the load of the node divided by the node capacity, where the load of a node v is the total flow value through v (including the demand of v itself). A flow in a directed graph is said to be a confluent flow if the entire flow departing a node for a particular destination is along a single outgoing edge. Confluent flows are often used in routing Internet traffic. Generally, Internet routing is typically based on selecting a shortest path tree to each destination and then routing along the selected shortest paths. Thus, all packets that depart a router for a particular destination use the same outgoing edge.

Consider a directed network $G=(V,A)$ with sink node t. Each node $v \in V$ wants to route $r_v$ units of flow to the sink, and each node $v \in V$ has a fixed uniform capacity (by scaling, this capacity is taken to be one, as fractional $r_v$ values are allowed). Bounded out-degree flows are feasible flows whose support graph has a bounded out-degree at every node. The maximum out-device of any node is at most n, where n is the number of nodes in the network. The class of network flows with out-degree at most d is denoted by $X_d$. The cases $d \in \{1,2,n\}$ are of particular interest. These flow classes are:

$X_n$ (Fractional Flows): flow from a node v to the sink t may be routed fractionally along any path; in particular, v may send flow on any number of outgoing arcs;

$X_1$ (Confluent Flows): flow from v to t must be routed on a unique path; in particular, v sends flow on at most one outgoing arc; and $X_2$ (Bifurcated Flows): flow may be sent from v on at most two outgoing arcs.

Bounded degree flows are natural and elegant combinatorial objects in their own right. Interest in them, however, is primarily motivated by certain distributed routing protocols. For example, consider how confluent flows are produced by the Open Shortest Path First (OSPF) protocol. This protocol is essentially a distributed implementation of the Dijkstra algorithm. Consequently, for a specific network destination t, OSPF populates each router v's next hop entry for t with some neighbor u of v for which there is a shortest path from v to t through u. In this context, "shortest" is determined with respect to some costs on the links (arcs) and, in intra-domain networks, these costs may be altered by the network operator to achieve better traffic flow through the network (see, for example, B. Fortz and M. Thorup, "Optimizing OSPF/IS-IS Weights in a Changing World," IEEE Journal on Selected Areas in Communications (Special Issue on Recent Advances on Fundamentals of Network Management), 20(4), 756-67 (2002). Hence, under these constraints, the collective flow destined for t is routed along a directed at borescence (rooted at t), that is, a confluent flow.

In many intra-domain networks, however, flows with higher but bounded degrees are allowed. For example, if there is more than one "shortest path" from v to t, operators may often place two or more next hops for t in the routing table. Traffic to t is then typically split using a round-robin approach. A need therefore exists for improved routing techniques for bifurcated flows.

SUMMARY OF THE INVENTION

Generally, methods and apparatus are provided with improved touting techniques for bifurcated flows. According to one aspect of the invention, routing methods and apparatus are provided that obtain a fractional flow from a set of nodes to a given destination having a maximum load, L, on any link between a node in the set and the given destination; and generate a bifurcated flow between the set of nodes and the given destination from the fractional flow such that the maximum load on any link in the bifurcated flow does not exceed 2L, wherein the bifurcated flow allows a flow from a given node to be sent on at most two outgoing links. The fractional flow can be, for example, a fractional single-sink multicommodity flow.

In various embodiments, one or mole flow simplifying operations are optionally applied to the fractional flow. For example, one flow simplifying operation comprises a contraction of an arc (v, u), where a node, v, has out-degree one and a node, u, is an out-neighbor of the node, v. The flow simplifying operation can also comprise an elimination of one or mole saw-tooth cycles, wherein a saw-tooth cycle is a collection $$\{(u_0,v_0),P_0,(u_1,v_1),P_1,(u_2,v_2),P_2,\ldots,(u_r,v_r),P_r\}$$

where $(u_i,v_i)$ is an arc between the nodes $u_i$ and $v_i$, and $P_i$ is a directed path from $u_{i+1}$, to $v_i$ (subscripts modulo r+1). In another variation, the one or more flow simplifying operations generate a tree graph, T, with bipartition classes X and Y such that each node of X has degree at least two and T contains a node $s \in X$ with at most one non-leaf neighbor in T.

The generating step can further include the step of redirecting part of a routing to obtain the bifurcated flow. For example, for a given node, s, having two child nodes, where one of the child nodes is a leaf node, the redirecting step allocates any additional flow into node, s, to the leaf node when the node, s, is removed. In addition, for a given node, s, having at least three child nodes, where at least two of the child nodes are leaf nodes, the redirecting step allocates flow from any non-leaf child nodes among the leaf nodes and allocates any additional flow into node, s, to the leaf nodes when the node, s, is removed.

A more complete understanding of the present invention, as well as further features and advantages of the present invention, will be obtained by reference to the following detailed description and drawings.

DETAILED DESCRIPTION

Suppose that G contains a fractional flow satisfying all the demands in which no node has load more than 1. The congestion gap, $\gamma(d)$, of a flow class $X_d$ is the worst ratio, over any network and any set of demands, of the congestion of an optimal flow in $X_d$ to the congestion of an optimal flow in $X_u$. J Chen et al, "Meet and Merge: Approximation Algorithms for Confluent Flow," Proc of the 35th ACM Symposium on Theory of Computing (STOC), 373-82 (2003) showed that there always exists a confluent flow with congestion $O(\sqrt{n})$. As discussed above, this was subsequently improved by Chen et al., "(Almost) Tight" that proved a congestion bound of $O(\log n)$ and gave an example to show that this result is tight (More precisely, they gave a bound of $O(\log k)$ where k is the number of nodes with outgoing arcs to the sink).

Thus, the congestion gap $\gamma(1)$ between fractional flows and confluent flows is $\Theta(\log n)$ in an uncapacitated (i.e., uniform capacity) network. Thus, the gap between flows in $X_1$ and flows in $X_n$ is unbounded but, evidently, as the maximum out-degree of a flow is allowed to increase, the congestion gap tends to one. However, it was not known whether obtaining a bounded congestion gap required allowing an unbounded maximum degree.

One aspect of the present invention recognizes that a bounded congestion gap can be obtained with bounded out-degrees. In fact, the congestion gap is all but eliminated if bifurcated flows are allowed, rather than confluent flows. Given a fractional flow of congestion one, there is a bifurcated flow with congestion at most two. Thus, the congestion gap $\gamma(2)$ between flows in $X_2$ and flows in $X_n$ is at most two in uncapacitated networks.

Figure 1:
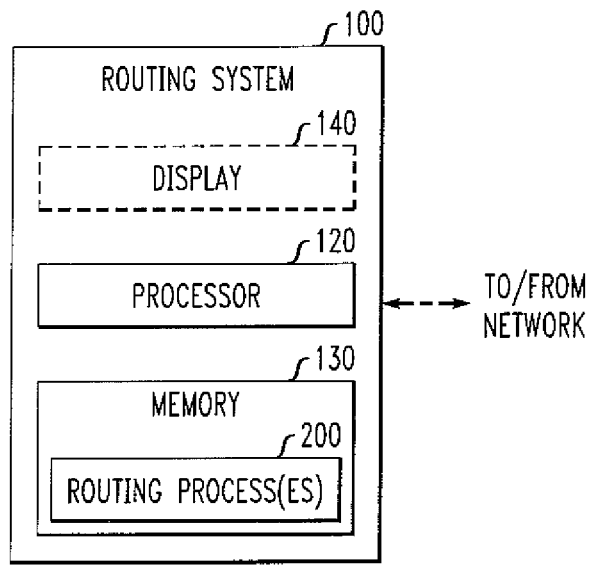
FIG. 1 is a block diagram of an exemplary routing system that can implement the processes of the present invention.

FIG. 1 is a block diagram of a routing system 100 that can implement the processes of the present invention. As shown in FIG. 1, a memory 130 configures a processor 120 to implement the routing methods, steps, and functions disclosed herein (collectively, shown as 200 in FIG. 1, and discussed further below in conjunction with FIG. 2). The routing system 100 optionally includes a display 140. The memory 130 could be distributed or local and the processor 120 could be distributed or singular. The memory 130 could be implemented as an electrical, magnetic or optical memory, or any combination of these or other types of storage devices. It should be noted that each distributed processor that makes up processor 120 generally contains its own addressable memory space. It should also be noted that some or all of computer system 100 can be incorporated into an application-specific or general-use integrated circuit.

Figure 2:
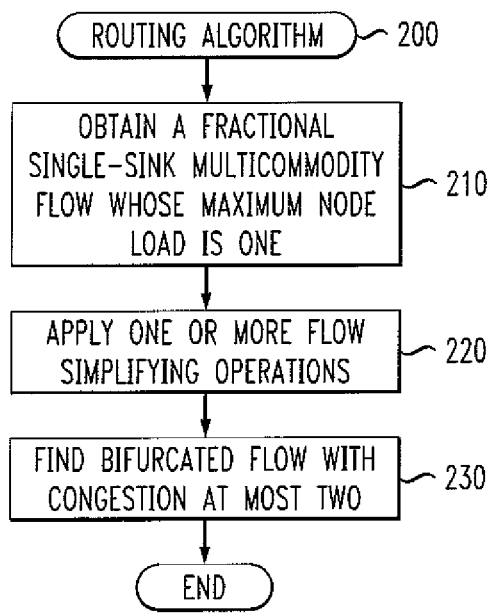
FIG. 2 is a flow chart describing an exemplary implementation of a routing algorithm incorporating features of the present invention.

FIG. 2 is a flow chart describing an exemplary implementation of a routing algorithm 200 incorporating features of the present invention. Generally, the disclosed routing algorithm starts during step 210 with a fractional single-sink multicommodity flow whose maximum node load is one. For example, the techniques of Chen et al can be used to obtain the fractional single-sink multicommodity flow whose maximum node load is one. The disclosed routing algorithm then proceeds during steps 220 and 230 to transform this multicommodity flow into a bifurcated flow with maximum load at most two. The routing algorithm applies one or more flow simplifying operations during step 220 that gradually bring the flow into a more manageable form, as discussed further below in the section entitled "Phase I—Flow Simplification." For example, the flow on any directed cycle can be reduced until the support of the flow is acyclic. Second, if there is a node v for which flow only leaves v on a single arc (u,v), then this arc is contracted. Another flow simplifying operation is a sawtooth cycle augmentation. A bifurcated flow with congestion at most two is determined during step 230, as discussed further below in the section entitled "Phase II—Flow Bifurcation".

The present invention recognizes that if no such further sawtooth augmentation is possible, then the directed support graph resembles a "layered graph" In a layered graph, the layers are defined as follows: $L_0=\{t\}$ and for each $i \geq 0$, $L_{i+1}=\{u \notin \cup_{j \leq i} L_j : \exists (u,v) \in A, v \in L_i\}$. In this case, the graph induced by adjacent layers $L_i \cup L_{i+1}$ will, in fact, be a forest. Moreover, each node in $L_{i+1}$ will have out-degree at least two. This allows the flow to be processed greedily from "top to bottom". That is, the flow is adjusted out of $L_{max}$, then out of $L_{max-1}$, etc. At each stage, the nodes in level $L_{i+1}$ are considered greedily by picking the most remote nodes in the current forest, that is, the nodes which are adjacent to at least one leaf in the forest. At any such node, the flow is redirected without causing the congestion at any node in the next layer, $L_i$, to exceed two.

Phase I—Flow Simplification

A node t can be removed and its set of in-neighbors $\Gamma^-(\{t\})=\{t_1, t_2, \ldots, t_k\}$ is referred to as the sink nodes. The goal of each node is then to route its demand to any combination of the sinks. Begin with a fractional flow f in G satisfying all the demands and having maximum node load one. It can be assumed that the (support of the) flow is acyclic; that is, the set of arcs with non-zero flow induce an acyclic graph. The routing algorithm 200 converts the flow f into a bifurcated flow f' with node congestion at most two. In the first phase of the exemplary routing algorithm 200, a combination of operations are performed that simplify the structure of flow. Given this simplified structure, in the second phase, the routing algorithm 200 redirects parts of the routing to obtain a bifurcated flow.

Figure 3:
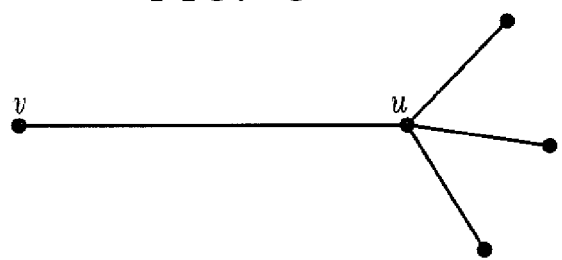
FIG. 3 illustrates a contraction of an arc (v,u), where node v has out-degree one, and u is the out-neighbor of v.

Given the initial fractional flow f, the routing algorithm 200 applies the following two operations during an exemplary implementation of step 220:

(i) Contractions: If v is a node with out-degree one, the arc (v,u) is contracted, where u is the out-neighbor of v, as shown in FIG. 3. The demands of u and v are assigned to the new contracted node.

Figure 4:
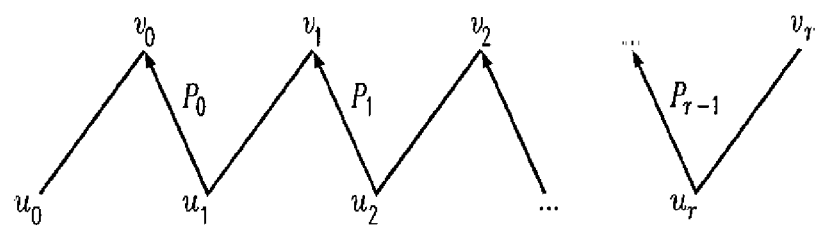
FIG. 4 illustrates an elimination of saw-tooth cycles.

(ii) Elimination of Saw-Tooth Cycles: A saw-tooth cycle is a collection $$\{(u_0,v_0), P_0, (u_1,v_1), P_1, (u_2,v_2), P_2, \ldots, (u_r,v_r), P_r\}$$

where $(u_i, v_i)$ is an arc and $P_i$ is a directed path from $u_{i+1}$ to $v_i$ (subscripts modulo r+1), as shown in FIG. 4. The manner in which the saw-tooths are identified is discussed below in conjunction with FIG. 5. Note that reversing the arcs in every $P_i$ would produce a directed cycle (Note also that r=0 is allowed, and since it is assumed that G has no parallel arcs, $P_0$ would have length at least two in this case) "Augmentation" along such a cycle can be done by adding $\in$ flow to each arc $(u_i, v_i)$ and subtracting $\in$ flow from every arc in each $P_i$ gives a new flow that still satisfies the capacity constraints of every node on the cycle. Therefore, this cycle can be eliminated by choosing ∈ to be the minimum flow on one of the arcs in any of the $P_i$; this gives a new flow whose support contains one less arc than the original flow.

As indicated above, a sawtooth cycle consists of any cycle (in the underlying undirected support graph) that has the form $\{(u_0,v_0),P_0,(u_1,v_1),P_1,(u_2,v_2),P_2,\ldots,(u_r,v_r),P_r\}$. Here, each $P_i$ consists of a directed path from $u_{i+1}$ to $v_i$ (subscript arithmetic modulo r+1). Given such a cycle, observe that the flow can be increased on each $(u_i,v_i)$ by some ∈>0, and decrease the flow on each $R_i$ by ∈, without increasing the load at any node. In some prior techniques, such cycles are considered at the "frontier" of the graph, that is, the nodes $v_i$ are all neighbors of the sink node t. The exemplary implementation of the routing algorithm 200 allows such sawtooth cycles to bounce around throughout the graph.

It is noted that performing a contraction operation may produce new saw-tooth cycles. It follows that an arc of the form $(u_i,v_i)$ may, in fact, correspond to a path in the original network whose internal nodes have out-degree one (and, hence, have been contracted into their out-neighbor). Observe that, in this case, load on these nodes may actually increase when the saw-tooth cycle is eliminated. However, the flow still obeys the capacity constraints because these internal nodes have less flow than the end node of the path $v_i$ and that node is not overloaded after augmenting a saw-tooth cycle.

Eliminating a saw-tooth cycle may also reduce the out-degree of a node to one causing more contractions. Thus, the routing algorithm 200 continues to perform either operation until no such operations are possible. Only a polynomial number of operations are performed, as either the number of nodes or the number of arcs are reduced by one in each step.

Figure 5:
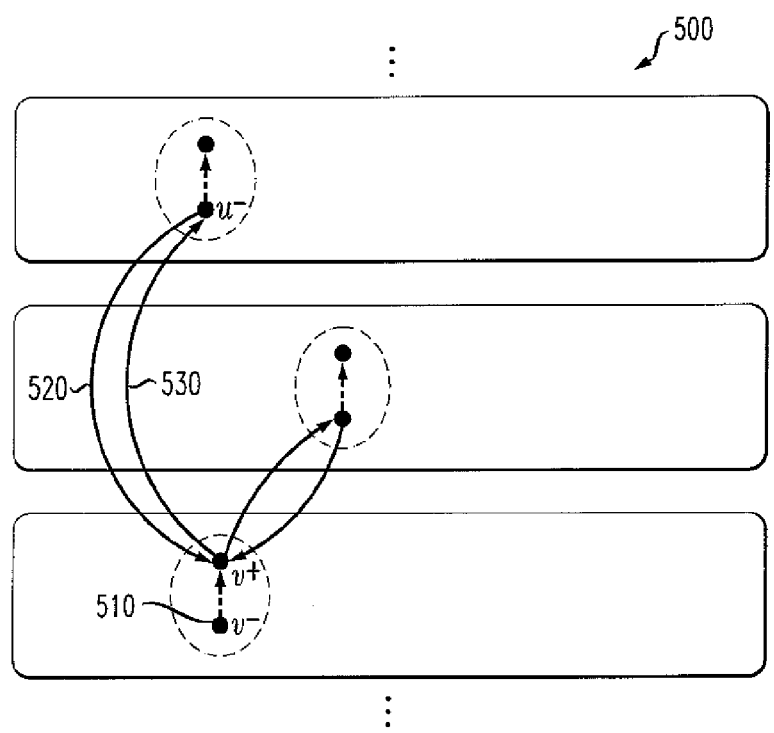
FIG. 5 illustrates an auxiliary digraph for identifying saw-tooth cycles.

In some prior techniques, a specific class of saw-tooth cycles are eliminated during the course of the algorithm (namely saw-tooth cycles incident to the sink nodes and so-called "frontier" nodes). For the disclosed routing algorithm 200, the flow is simplified as much as possible by eliminating essentially all saw-tooth cycles. Consider the following auxiliary digraph D(G) (or simply D if the context is clear). D is a bipartite graph with (node) bipartition classes ! and ⊕; for each node v∈G, there are two nodes $v^-$∈! and $v^+$∈⊕ in D. As shown in FIG. 5, the auxiliary graph 500 contains three types of arcs:

1. For each node v∈G, there is an arc from $v^-$ to $v^+$ in D; referred to as a node arc 510
2. For each arc (u,v) in G, there is an arc from $u^-$ to $v^+$ in D; referred to as a real arc 520
3. For each arc (u,v) in G, there is an arc from $v^+$ to $u^-$ in D; referred to as a complementary arc 530.

Thus, the auxiliary graph 500 consists of a set of digons (formed by real and complementary arcs 520, 530) plus a collection of node arcs 510 (A digon is a pair of arcs that form a simple directed cycle of length two.) Using this auxiliary graph 500, the following is obtained:

G contains a saw-tooth cycle if and only if the auxiliary graph D contains a (simple) cycle of length at least three (and hence at least four).

The next section shows how to determine whether any digraph has a cycle of length at least three, and this also gives the required structural characterization (as well as an algorithm) for detecting the existence of sawtooth cycles. Thus, at the end of the first phase of the algorithm 200, a fractional flow f is obtained that contains no saw-tooth cycles and no nodes with out-degree one.

Structural Properties of the Flow

Digon-Tree Representations

Suppose D=(V,A) is a directed graph such that the underlying graph induced by the digons of D forms a forest. Then, D has a digon-tree representation Δ where Δ is the digraph obtained by contracting (and then deleting) the digon edges of D. If Δ is acyclic, then D has an acyclic digon-tree representation. The nodes of Δ are referred to as digon-tree nodes, and a node that was not incident to a digon in D, forms a singleton digon-tree node in Δ

Digon-tree representations characterize when every circuit in a digraph contains a digon. These representations will be used in the second phase to guide how flow is redirected; in particular, they are used to determine the order in which nodes have their out-going flow redirected. Note that if every circuit contains a digon, then the graph contains no loops or cycles of length at least three.

As set forth in B Shepherd and A Vetta, "Visualizing, Finding and Packing Dijoins," in D Avis, A Hertz, O Marcotte (eds), Graph Theory and Combinatorial Optimization, 219-54 (2005), if D is a digraph without loops or parallel arcs, then D has no cycle of length at least three if and only if it has an acyclic digon-tree representation.

In addition, G contains no saw-tooth cycles if and only if its auxiliary graph D has an acyclic digon-tree representation Δ.

Flow Structure

Given f and the corresponding graph G, take the auxiliary graph D discussed above. It is known that D has an acyclic digon-tree representation Δ. Observe that Δ has the following properties:

For any node v ∈G, $v^-$ and $v^+$ are contained in different digon-trees in the acyclic digon-tree representation.

Take a node v with in-degree and out-degree at least one in G. Then, $v^-$ and $v^+$ are both in non-singleton digon-tree nodes in Δ.

Conversely, for each sink node $t_1, t_2, \ldots, t_k$ in G, $t_i^-$ is in a singleton digon-tree node. For each source node (zero in-degree) $S_1, S_2, \ldots, S_l$ in G, $S_i^+$ is in a singleton digon-tree node.

In particular, take a non-singleton digon-tree node T∈Δ. It contains a set of nodes X⊆⊖ and a set of nodes Y⊆⊕. From the above discussion, it is observed:

(a) X and Y correspond respectively to disjoint nodes sets X',Y' in G (b) The out-neighborhood of X', namely $\Gamma_G^+(X')$ is exactly Y'

(c) The in-neighborhood $\Gamma_G^-(Y')$=X'.

These properties and observations will be important in applying the second phase as they will be used to determine the order in which nodes are processed by the algorithm.

Phase II—Flow Bifurcation

The second phase starts from the graph G and processes it based on the digon-tree representation of its auxiliary graph. This can be done in rounds. Each round is identified with a digon-tree node T* in the associated auxiliary digraph Δ. Within each round, steps are made as the routing algorithm 200 processes the source nodes s of G (that is, the remaining parts of G that are still being processed) that lie in this digon-tree one by one. Processing s determines how to redirect its flow to two of its out-neighbors, after which s is deleted from the graph. (Note that this ensures that each non-sink node continues to have out-degree two as in the original G).

Note that in Phase II, the routing algorithm 200 keeps track of the old flow values f(u,v) and adds some new flow whenever flow is redirected. The total flow at a node v is referred to as the sum of the old flow $f(v)=\Sigma_{(u,v)\in G}f(u,v)$ plus whatever new (shunted) flow has found its way to v. The routing algorithm 200 aims to bound this total flow at each node. The following discussion describes how to pick the nodes to process, and how to redirect flow.

The digon-tree nodes are processed in the reverse of the acyclic ordering defined above. That is, at each step a new digon-tree node T* is selected such that there are no arcs leaving T* in Δ. Note that if s is some source node that lies in G, then s⁺ would be a singleton-digon-tree node with a single arc entering it. It is assumed that such singleton nodes are always removed first. If this is the case, then the next digon-tree node T* in the acyclic order will not be a singleton node, and since it has no arcs leaving it, its ! nodes correspond to sources in the current subgraph of G. This is summarized as:

If G still contains some arcs, then in the auxiliary digraph D, there is a non-singleton digon-tree node T* whose set of ! nodes corresponds to a subset of sources in G.

The next mode to be processed, s, is found amongst the nodes in the specified digon-tree node T*. Let T be any tree graph with bipartition classes X and Y such that each node of X has degree at least two. Then, T contains a node s∈X with at most one non-leaf neighbor in T.

Let T* be the next non-singleton digon tree node, and apply the lemma to its underlying undirected graph to obtain a source node s∈G, with s⁻∈T*. This node is processed in the next step.

The original maximum load on any node is denoted $u_{max}$. bifurcated flow can be created by processing nodes (in the order described above) such that for each node v, its total load is at most $f(v)+u_{max}$. Note that the plus nodes in T* now correspond to sources in the remaining graph G. Phase II terminates when G consists only of the sink nodes $\{t_1, t_2, \ldots, t_k\}$ at which point all the nodes will be overloaded by at most $u_{max}$.

It has been found that there is a bifurcated flow such that each node v has load at most $f(v)+u_{max}$. In particular, there is a bifurcated flow with congestion at most two.

Figure 6:
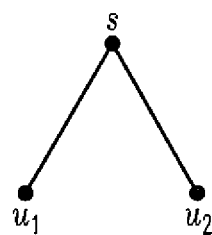
FIGS. 6 and 7 illustrate two possible cases for a bifurcated flow from a node s.

Consider s⁻∈T*. By induction, s is currently overloaded by at most $u_{max}$. Now all of the neighbors of s⁻ in T* bar at most one, are leaves. Let the out-neighbors of s in T* (and hence the remaining part of G) be $u_1, u_2, \ldots, U_r$; here r≥2 as s has out-degree at least two. Letting $u_1, u_2, \ldots, U_{r-1}$ be leaves in the digon-tree node, then there are two cases:

(i) r=2, shown in FIG. 6: One of the nodes, such as node $u_1$, must be a leaf node. Keep the flow the same on $f(s,u_1)$ and $f(s,u_2)$, but move the (possibly) additional $u_{max}$ load from s to $u_1$. Since $u_1$ is a leaf, it becomes a source after the removal of s with load at most $f(u_1)+u_{max}$.

Figure 7:
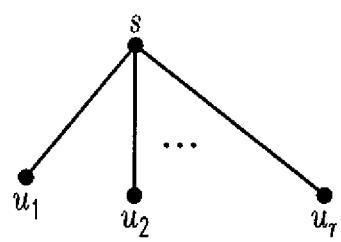

(ii) r≥3, shown in FIG. 7: so $u_1$ and $u_2$ are leaves. Clearly, $\Sigma_{j\geq 3} f(s,u_j) \leq f(s)$. Remove the arcs $\{(s,u_j): j\geq 3\}$ and split this flow equally on the arcs $(s,u_1)$ and $(s,u_2)$. In addition, since s is a source it may have an additional bundle of demand of size $u_{max}$. This bundle is also split equally on the arcs $(s,u_1)$ and $(s,u_2)$. Thus, the total load at $u_1$ (respectively, $u_2$) increases by at most.

$$\frac{1}{2}\left(\sum_{j\geq 3} f(s, u_j) + u_{max}\right) \leq \frac{1}{2}(f(s) + u_{max}) \leq u_{max}$$

Since $u_1, u_2$ are leaves, both $u_1$ and $u_2$ become sources after the removal of s. The result now follows.

It has been found that this upper bound on the congestion gap is tight. For all ∈>0 there is a network having a flow with maximum node load 1 but where all bifurcated flows have node congestion at least 2−∈.

The disclosed congestion bound gives a polynomial time algorithm to convert a fractional flow into a bifurcated flow with congestion at most two. Therefore, there is a factor two-approximation algorithm for the problem of finding a minimum congestion bifurcated flow, denoted below. This problem is maxSNP-hard.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A routing method, comprising:

obtaining a fractional flow on operational links between nodes in a set of nodes and a given destination, wherein each of said operational links has a load, l, and wherein a maximum load, L, is a maximum of said loads, l, on any operational link between a node in said set and said given destination;

applying one or more flow simplifying operations to said fractional flow to remove one or more of said operational links in said fractional flow until at most two outgoing operational links are employed from each node in said set to said given destination, wherein said one or more removed operational links have a flow at a time of said removal, wherein said operational links are selected for removal by said one or more flow simplifying operations by identifying one or more of said operational links in said fractional flow that one or more of satisfy a contraction property and are identified in a saw-tooth structure, wherein said contraction property comprises a link between a first node and a second node, where said first node has out-degree one and said second node is an out-neighbor of said first node, and wherein said sawtooth structure is a collection:

$$\{(u_0,v_0),P_0,(u_1,v_1),P_1,(u_2,v_2),P_2,\ldots,(u_r,v_r),P_r\}$$

where $(u_i, v_i)$ is an arc between said nodes $u_i$ and $v_i$ and $P_i$ is a directed path from $u_{i+1}$ to $v_i$ (subscripts modulo r+1); and
generating, based on said applying, a bifurcated flow between said set of nodes and said given destination from said fractional flow such that the maximum load on any operational link in said bifurcated flow does not exceed 2L, wherein said bifurcated flow allows a flow from a given node to be sent on at most two outgoing operational links, wherein one or more of said obtaining and generating steps are performed by a hardware device.

2. The method of claim 1, wherein said fractional flow is a fractional single-sink multicommodity flow.

3. The method of claim 1, wherein said one or more flow simplifying operations comprises a contraction of an arc (v, u), where a node, v, has out-degree one and a node, u, is an out-neighbor of said node, v.

4. The method of claim 1, wherein said one or more flow simplifying operations generate a tree graph, T, with bipartition classes X and Y such that each node of X has degree at least two and T contains a node s ∈X with at most one non-leaf neighbor in T.

5. The method of claim 1, wherein said generating step further comprises the step of redirecting part of a routing to obtain said bifurcated flow.

6. The method of claim 5, wherein for a given node, s, having two child nodes, where one of said child nodes is a leaf node, wherein said redirecting step allocates any additional flow into node, s, to said leaf node when said node, s, is removed.

7. The method of claim 5, wherein for a given node, s, having at least three child nodes, where at least two of said child nodes are leaf nodes, wherein said redirecting step allocates flow from any non-leaf child nodes among said leaf nodes and allocates any additional flow into node, s, to said leaf nodes when said node, s, is removed.

8. A routing apparatus, the apparatus comprising:
a memory; and at least one processor, coupled to the memory, operative to:
obtain a fractional flow on operational links between nodes in a set of nodes and a given destination, wherein each of said operational links has a load, l, and wherein a maximum load, L, is a maximum of said loads, l, on any operational link between a node in said set and said given destination;
apply one or more flow simplifying operations to said fractional flow to remove one or more of said operational links in said fractional flow until at most two outgoing operational links are employed from each node in said set to said given destination, wherein said one or more removed operational links have a flow at a time of said removal, wherein said operational links are selected for removal by said one or more flow simplifying operations by identifying one or more of said operational links in said fractional flow that one or more of satisfy a contraction property and are identified in a saw-tooth structure, wherein said contraction property comprises a link between a first node and a second node, where said first node has out-degree one and said second node is an out-neighbor of said first node, and wherein said sawtooth structure is a collection:

$$\{(u_0,v_0),P_0,(u_1,v_1),P_1,(u_2,v_2),P_2,\ldots,(u_r,v_r),P_r\}$$

where $(u_i, v_i)$ is an arc between said nodes $u_i$ and $v_i$ and $P_i$ is a directed path from $u_{i+1}$ to $v_i$ (subscripts modulo r+1); and
generate, based on said applying, a bifurcated flow between said set of nodes and said given destination from said fractional flow such that the maximum load on any operational link in said bifurcated flow does not exceed 2L, wherein said bifurcated flow allows a flow from a given node to be sent on at most two outgoing operational links.

9. The routing apparatus of claim 8, wherein said fractional flow is a fractional single-sink multicommodity flow.

10. The routing apparatus of claim 8, wherein said one or more flow simplifying operations comprises a contraction of an arc (v, u), where a node, v, has out-degree one and a node, u, is an out-neighbor of said node, v.

11. The routing apparatus of claim 8, wherein said one or more flow simplifying operations generate a tree graph, T, with bipartition classes X and Y such that each node of X has degree at least two and T contains a node s ∈X with at most one non-leaf neighbor in T.

12. The routing apparatus of claim 10, wherein said processor is further configured to generate said bifurcated flow by redirecting part of a routing to obtain said bifurcated flow.

13. The routing apparatus of claim 12, wherein for a given node, s, having two child nodes, where one of said child nodes is a leaf node, wherein said redirecting step allocates any additional flow into node, s, to said leaf node when said node, s, is removed.

14. The routing apparatus of claim 12, wherein for a given node, s, having at least three child nodes, where at least two of said child nodes are leaf nodes, wherein said redirecting step allocates flow from any non-leaf child nodes among said leaf nodes and allocates any additional flow into node, s, to said leaf nodes when said node, s, is removed.

15. An article of manufacture, comprising a non-transitory machine readable recordable medium containing one or more programs which when executed implement the steps of:
obtaining a fractional flow on operational links between nodes in a set of nodes and a given destination, wherein each of said operational links has a load, l, and wherein a maximum load, L, is a maximum of said loads, l, on any operational link between a node in said set and said given destination;
applying one or more flow simplifying operations to said fractional flow to remove one or more of said operational links in said fractional flow until at most two outgoing operational links are employed from each node in said set to said given destination, wherein said one or more removed operational links have a flow at a time of said removal, wherein said operational links are selected for removal by said one or more flow simplifying operations by identifying one or more of said operational links in said fractional flow that one or more of satisfy a contraction property and are identified in a saw-tooth structure, wherein said contraction property comprises a link between a first node and a second node, where said first node has out-degree one and said second node is an out-neighbor of said first node, and wherein said sawtooth structure is a collection:

$$\{(u_0,v_0),P_0,(u_1,v_1),P_1,(u_2,v_2),P_2,\ldots,(u_r,v_r),P_r\}$$

where $(u_i, v_i)$ is an arc between said nodes $u_i$ and $v_i$ and $P_i$ is a directed path from $u_{i+1}$ to $v_i$ (subscripts modulo r+1); and generating, based on said applying, a bifurcated flow between said set of nodes and said given destination from said fractional flow such that the maximum load on any operational link in said bifurcated flow does not exceed 2L, wherein said bifurcated flow allows a flow from a given node to be sent on at most two outgoing operational links.

16. The article of manufacture of claim 15, wherein said one or more flow simplifying operations comprises a contraction of an arc (v, u), where a node, v, has out-degree one and a node, u, is an out-neighbor of said node, v.

17. The article of manufacture of claim 15, wherein said one or more flow simplifying operations generate a tree graph, T, with bipartition classes X and Y such that each node of X has degree at least two and T contains a node s $\in$ X with at most one non-leaf neighbor in T.

* * * * *